United States Patent [19]

Bilak

[11] 4,254,540
[45] Mar. 10, 1981

[54] STAMPED BEVEL GEAR

[76] Inventor: William Bilak, 24799 Lake Shore Blvd., Euclid, Ohio 44123

[21] Appl. No.: 894,538

[22] Filed: Sep. 27, 1978
(Under 37 CFR 1.47)

[51] Int. Cl.³ .................. B21D 53/28; B21K 1/30; B23P 15/14
[52] U.S. Cl. ........................ 29/159.2; 72/377; 72/379; 29/159 R
[58] Field of Search ........... 29/159.2, 159 R, 159.3, 29/406; 72/334, 335, 356, 377, 379; 113/116 D; 74/449; 428/65, 66, 132

[56] References Cited
U.S. PATENT DOCUMENTS

| 2,072,308 | 3/1937 | Labin | 29/159.2 |
| 2,127,969 | 8/1938 | Dingwerth | 29/159.3 |
| 2,157,354 | 5/1939 | Sherman | 72/379 X |
| 2,850,794 | 9/1958 | Bondurant | 29/159.2 |
| 3,354,689 | 11/1967 | Tirone | 72/334 |
| 3,434,327 | 3/1969 | Speakman | 29/446 X |
| 3,893,818 | 7/1975 | Mickus | 29/159.3 X |
| 3,895,922 | 7/1975 | Phillips | 72/377 X |

Primary Examiner—Lowell A. Larson
Attorney, Agent, or Firm—Squire, Sanders & Dempsey

[57] ABSTRACT

A method of manufacturing gear forms comprising cold forming metal stock to produce a workpiece having a protruding hub portion with a central opening, impressing indentations in the hub portion by means of appropriate dies, boring and counterboring the region around the hub portion, and modifying the central opening according to the configuration of a shaft to be received thereby.

12 Claims, 9 Drawing Figures

STAMPED BEVEL GEAR

This invention relates to the manufacture of gears, and more specifically to the manufacture of thin-wall metal gear forms having hubs for supporting the gears during rotation.

The fabrication of gears, cams and the like from metal plate is well known, as shown in U.S. Pat. Nos. 1,352,021; 1,729,300; 1,847,926; 2,072,308; 2,850,794; and 3,206,840. U.S. Pat. No. 1,352,021 provides for the manufacture of bevel gears by stamping a spur gear blank and then bending the blank to form the desired bevel gear. U.S. Pat. No. 1,847,926 describes a similar process wherein crown gears are made from a similar blank by means of a swaging punch. U.S. Pat. No. 2,072,308 discloses the manufacture of an integral gear wheel and pinion by means of a series of forming and stamping operations. The process disclosed in U.S. Pat. No. 2,850,794 relates to the manufacture of a worm gear with an integral hub sheet stock. The manufacture of bevel gears by cold forming processes using thicker blanks are described in U.S. Pat. Nos. 3,675,459; 3,731,516; 3,780,413 and 3,887,987.

It is an object of the present invention to fabricate gear forms in an improved manner. It is a more particular object to fabricate forms for lightweight gears in an improved, economical manner. Another object of the invention is to provide to process for manufacturing forms for sheet metal gears using known equipment in a manner susceptible of high volume production. Yet another object of the invention is to provide an improved process for manufacturing high quality sheet metal gear forms having hubs.

A general object of the invention is to provide a process for manufacturing sheet metal gear forms in a manner which is efficient, economical and practicable. Other objects will be apparent from the description to follow and from the appended claims.

The foregoing objects of the invention are achieved by the provision of a method for the manufacture of a gear form from strip metal using a combination of simple cold-forming techniques to produce a workpiece which can be further processed to form a gear with an integral hub.

This preferred embodiment of the invention described below is a method of manufacturing a form or blank for a gear having an integral hub, and includes the steps of piercing a hole in flat metal strip stock; forming a projection coaxially with the hole and expanding the hole; reforming the resulting workpiece by reducing the height of the wall of the projection while simultaneously coining circular depressions around the projection wall and around the hole on both sides of the workpiece; forming indentations at regular intervals around the outside of the wall in accordance with the shape of the drive shaft to be used with gear, causing a flow of the displaced metal to square off the edge of the hole in the workpiece surface opposite the projection; coining a center counterbore coaxially with the hole while reducing the height of the projection; and piercing the region around the hole according to the dimensions of the drive shaft to be received by the hole. In the foregoing steps, there are no substantial restrictions to the flow of displaced metal, whereby the structural integrity of the workpiece is maintained.

The preferred embodiment of the invention is described below, with reference to the drawings in which.

Figure 1:
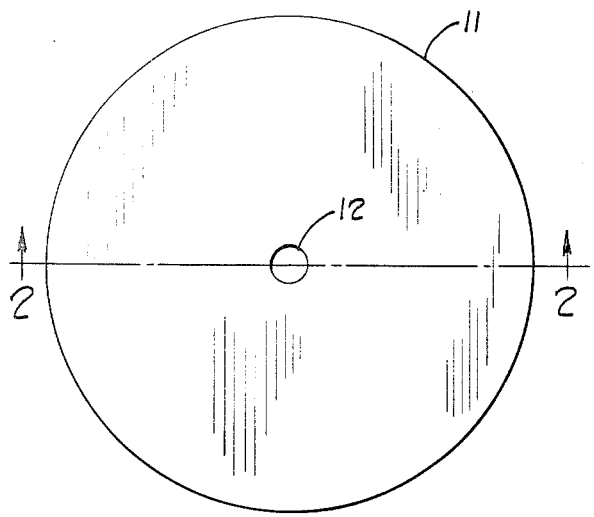
FIG. 1 is a plan view of circular metal plate with a hole pierced in the center.
Figure 2:
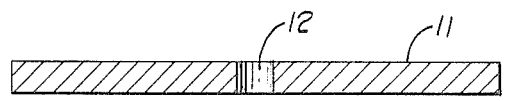
FIG. 2 is a section taken at line 2—2 of FIG. 1.

More particularly, FIGS. 1 and 2 show a metal plate 11 of strip stock with a hole 12 which has been pierced in its center by punching or by any other means known in the art. While the plate is depicted in FIG. 1 as circular, it could be polygonal, such as square or rectangular, subject to later trimming to the desired shape. The location of the hole is a matter of choice but is usually in a central position since the final product is normally of a generally circular configuration, concentric about the hole. The size of the hole 12 is a matter of choice and is best determined by trial and error. As a simple rule, the diameter of the hole 12 should be at least as great as the thickness of the plate 11 and should be no greater than about one-half the desired wall height of the male projection in the finished hub.

Figure 3:
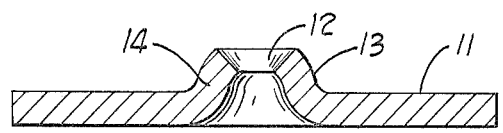
FIGS. 3 and 4 show the section of FIG. 2 as it is reshaped during subsequent steps in accordance with this invention.
Figure 4:
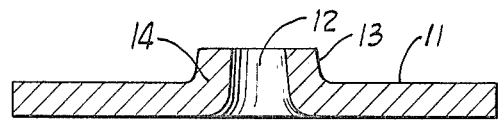

As shown in FIG. 3, a protrusion or male projection 13 having a wall 14 is formed in the plate 11 with some expansion of the size of hole 12 by striking or pressing the metal around the edge of the hole 12 with a simple round-ended punch such as a ball-nosed or spherical radius punch against a flat die having no other restriction than a circular female opening of sufficient size to accept the protrusion shape when the punch enters the plate 11. The punch is applied along the axis of the hole 12. A tapered punch is then used, if necessary, to enlarge further the hole 12 to the size indicated in FIG. 4. The number of punching operations generally depends upon the thickness of the metal, and one or two punching operations will generally suffice to achieve the shape shown in FIG. 4.

Figure 5:
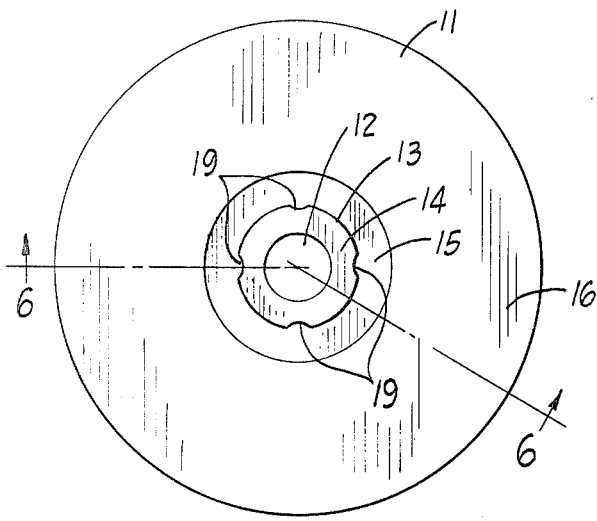
FIG. 5 is a plan view of the subject plate after several cold forming operations.
Figure 6:
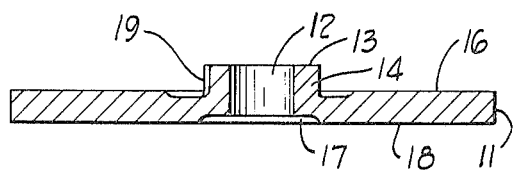
FIG. 6 is a section taken at line 6—6 of FIG. 5.

The next of forming operations could be applied to the workpiece seriatim, but are instead effected simultaneously by appropriate die(s) mounted in a conventional die press and conventional metal working tools. Thus, the following processes are done at one work station:

(a) axially compressing protrusion 13 to reduce the height of wall 14 as shown in FIG. 6 without substantially restricting the flow of displaced metal;

(b) coining a circular depression 15 in the surface 16 of the plate 11 concentrically about the base of male projection 13 as shown in FIGS. 5 and 6, without substantially restricting the flow of displaced metal;

(c) coining a circular depression 17 in the undersurface 18 of plate 11 opposite surface 16, without substantially restricting the flow of displaced metal; and (d) forming indentations 19 equi-angularly disposed in the exterior surface of the wall 14 parallel to the axis of the hole. The function of indentations 19 is to provide engagement surfaces to facilitate the gripping of the outer surface of projection 13. The foregoing operations are preferably effected without a punch or die in hole 12, to allow the displaced metal to flow unimpeded in the edge of hole 12 in the coined area 17, to build up the wall 14. These changes are all shown in FIGS. 5 and 6.

Figure 8:
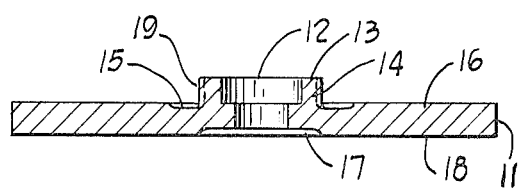
FIG. 8 is a section taken at the line 8—8 in FIG. 7.
Figure 7:
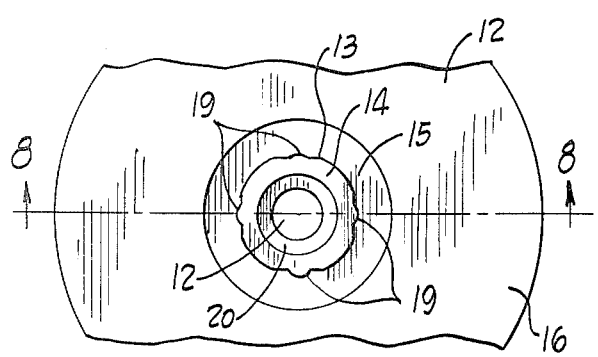
FIG. 7 is a partial plan view of the plate after a still further forming step.

The following independent steps are next applied to the workpiece, simultaneously for reasons of economy, to achieve the product shown in FIGS. 7 and 8:

(a) coining a normally circular center counterbore 20, concentrically about hole 12, the diameter of the counterbore being at least as great as the greatest lateral dimension of the aforementioned drive shaft; and (b) flattening the top of the wall 14 of the male projection 13, allowing the metal in said wall to spread and increase the thickness of wall 14 and the outside diameter of male projection 13. These changes are shown in FIGS. 7 and 8.

Figure 9:
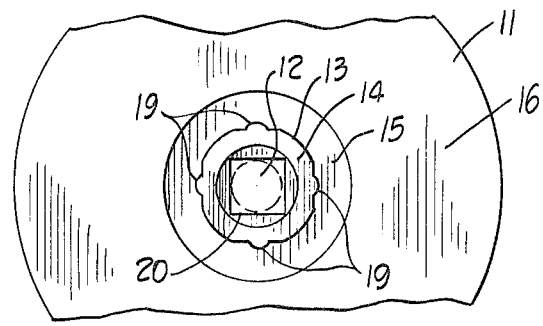
FIG. 9 is the same partial plan view as FIG. 8 after a final piercing step.

Finally, the hub portion of the workpiece is completed by piercing the metal around hole 12, shown in FIG. 7, to form a shaped hole having a profile substantially the same as the cross-section of the aforementioned drive shaft with which the hub is to mate. The resulting product depicted in FIG. 9 shows hole 12 as having been square.

The present invention specifically provides for the unrestricted and free-flow of the plate metal while it is being worked, thus avoiding the extreme pressures inherent in standard drawing and die pressing techniques wherein the metal is substantially confined. Moreover, the metal flow builds up and strengthens otherwise weakened parts of the workpiece. While the metal is preferably steel, other metals can be used.

The method of this invention forms a strong high quality wheel or gear form having an integral hub. A gear can be made by techniques well known in the prior art by cutting gear teeth in the plate 11 at any time, but it is preferable that this be done after the hub is formed. The resulting form can be used with particular advantage to fabricate bevel gears or crown gears.

The invention has been described in detail with particular reference to preferred embodiments thereof, but it will be understood that variations and modifications within the spirit and scope of the invention may occur to those skilled in the art to which the invention pertains.

I claim:

1. A method for manufacturing a gear form having an integral hub with a central opening for receiving a drive shaft having a predetermined cross-sectional shape, said method comprising the steps of:
    (a) piercing a hole defined by an edge in a metal stock workpiece;
    (b) forming a protrusion in the region of the stock including the hole, without substantially restricting the flow of displaced metal along the length of the protrusion;
    (c) compressing the protrusion with no forming tools in the hole, to a predetermined height without substantially restricting the flow of the displaced metal into the edge of the hole; and
    (c) piercing the region surrounding the hole to the cross-sectional shape of the drive shaft.

2. The invention according to claim 1 and further including a step of enlarging the hole in conjunction with the step of forming the protrusion.

3. The invention according to claim 1 and including the further step of forming a first depression in the region about the hole without substantially restricting the flow of displaced metal into the region of the hole.

4. The invention according to claim 3 wherein the step of forming the first depression is accomplished by coining the first depression.

5. The invention according to claim 3 and further including the step of forming a second depression in the region about the hole on the opposite side of the workpiece from the first depression.

6. The invention according to claim 5 wherein the step of forming the second depression is accomplished by coining the second depression.

7. The invention according to claim 1 wherein the hole has a central axis, and the method includes the further step of forming a plurality of equi-angularly disposed indentations on the exterior of the protrusion extending parallel to and about the axis of the hole.

8. The invention according to claim 1 and including the further step of forming a center counterbore in the region about the hole with a diameter at least as great as the greatest lateral dimension of the cross-section of the drive shaft, prior to the final piercing step.

9. The invention according to claim 8 wherein the step of forming the center counterbore is accomplished by coining the counterbore.

10. The invention according to claim 1, wherein said step of forming a protrusion comprises forming the protrusion using a round-ended punch and a flat die, said die having an opening sufficient to accept said protrusion when said punch enters said workpiece and having no other restriction to the flow of displaced metal.

11. A method for manufacturing a gear form having an integral hub with a central opening for receiving a drive shaft having predetermined cross-sectional shape, said method comprising the steps of:
    piercing a hold defined by an edge in a metal stock workpiece;
    forming a protrusion in the region of the stock including the hole, without substantially restricting the flow of displaced metal along the length of the protrusion;
    compressing the protrusion to a predetermined height without any forming tool in the hole and without substantially restricting the flow of the displaced metal into the edge of the hole;
    piercing the region surrounding the hole to the cross-sectional shape of the drive shaft; and
    flattening the uppermost surface of the protrusion without substantially restricting the flow of the displaced metal.

12. A method for manufacturing a gear form having an integral hub with a central opening for receiving a drive shaft having a predetermined cross-sectional shape, said method comprising the steps of:
    piercing a hole defined by an edge in a metal stock workpiece;
    forming a protrusion in the region of the stock including the hole, without substantially restricting the flow of displaced metal along the length of the protrusion;
    compressing the protrusion to a predetermined height without any forming tool in the hole and without substantially restricting the flow of the displaced metal into the edge of the hole;
    piercing the region surrounding the hole to the cross-sectional shape of the drive shaft; and
    forming a plurality of equi-angularly disposed indentations on the exterior of the protrusion extending parallel to and about the axis of the hole, said forming step comprising causing the displaced metal to flow inimpededly and build up the area about said hole.

* * * * *